United States Patent [19]
Wefers et al.

[11] 3,949,195
[45] Apr. 6, 1976

[54] SENSING ROD FOR THE MANUAL SCANNING OF GRAPHIC INFORMATION

[75] Inventors: Norbert Wefers, Wilhelmshaven; Uwe Unglaube; Joachim Schwarzkopf, both of Berlin, all of Germany

[73] Assignee: Nixdorf Computer AG, Paderborn, Germany

[22] Filed: Apr. 22, 1974

[21] Appl. No.: 463,042

[30] Foreign Application Priority Data
Apr. 25, 1973  Germany...................... 7315714[U]

[52] U.S. Cl. ........................ 235/61.11 E; 250/555
[51] Int. Cl.² ...................... G06K 7/10; G08C 9/06
[58] Field of Search...... 235/61.11 E; 250/555, 566; 340/146.3 F

[56] References Cited
UNITED STATES PATENTS

| 3,727,030 | 4/1973 | McMurtry | 235/61.11 E |
| 3,735,142 | 5/1973 | Harr et al. | 235/61.11 E |
| 3,784,794 | 1/1974 | Allais | 235/61.11 E |

Primary Examiner—Daryl W. Cook
Attorney, Agent, or Firm—Woodhams, Blanchard and Flynn

[57] ABSTRACT

A sensing rod for use in the manual scanning of graphic information. The sensing rod has a tip which is adapted to both reflect light and to receive light which is reflected from an information carrier. A light-emitting section is provided at the front end of the gripping zone which is optically coupled with at least one source of light arranged in the sensing rod.

15 Claims, 5 Drawing Figures

U.S. Patent   April 6, 1976   3,949,195

SENSING ROD FOR THE MANUAL SCANNING OF GRAPHIC INFORMATION

CROSS REFERENCE TO RELATED APPLICATION

This application is related to our copending application Ser. No. 463,041, filed Apr. 22, 1974.

FIELD OF THE INVENTION

The invention relates to a sensing rod for the manual scanning of graphic information having a tip which is adapted to both emit light and receive light which is reflected from an information carrier and a light conducting element and, if necessary, a shaft containing an opto-electronic transformer device.

BACKGROUND OF THE INVENTION

A sensing rod of this type is for example used in connection with the sensing of bar coded labels. The sensing rod conducts the light of a light source which, if necessary, is installed, onto an information carrier and the light is reflected from the information carrier onto a photo-electric receiver. The sensing rod is guided over the information carrier in such a manner that its tip contacts same. The light conducting elements are guided within the sensing rod onto an opto-electronic transformer device, so that the sensing rod is then connected to the actual sensing device through an electric connecting cable. It is, however, also possible to utilize light conducting elements in the form of long light conducting fibers, which extend through a connecting cable directly to the sensing device. The similar situation is true also for the arrangement of a light source which can be provided either in the sensing rod itself or in the sensing device.

The operation of a sensing rod as an independent element which is separate from the actual sensing device may require an additional signalling device on the sensing rod itself, in order to, for example, inform the operator that a just now completed sensing operation was successful or contained errors. Advantageously such a signalling takes place on the sensing rod to avoid increased requirements with respect to the concentration of the operator to continually watch the sensing device.

SUMMARY OF THE INVENTION

Therefore, the purpose of the invention is to construct a sensing rod of the aforedescribed type in such a manner that, aside from the scanning function in the zone of its tip, an additional zone for signalling is provided, which, without any considerable interference with the outer shape of the sensing rod, permits a reliable optic characterizing of certain operating conditions without interfering with the optical operation at the tip of the sensing rod.

A sensing rod of the type mentioned in the beginning is constructed inventively to attain said purpose in such a manner that on the peripheral surface of the shaft, which peripheral surface lies in front of the gripping zone, there is provided at least one light-emitting section which is optically coupled with at least one light source which is arranged in the shaft.

A sensing rod of this type permits a reliable signalling because the section which emits light can be illuminated by the light source from the inside of the sensing rod. Due to the fact that the section which emits the light is arranged in front of the gripping zone on the peripheral surface of the shaft, an optical signalling is reliably noticed, because a covering of the section which emits the light by the hand of the operator does not exist.

The section which emits the light can be constructed as a ring which extends around the shaft. This ring can lie in the peripheral surface of the shaft and may be formed as a whole of a translucent material. It is, however, also possible to arrange several sections which emit light distributed on a peripheral line of the shaft. In this case each of the sections emitting light can have associated therewith a light source inside the shaft. As will be described later on, several sections which emit light can, however, also be coupled with one single light source.

The shaft can in a further embodiment of the invention have an annular part of enlarged diameter, in which the section or sections emitting light are arranged. Advantageously the annular part of enlarged diameter forms then an annular edge which does not face the tip of the sensing rod, on which edge the section or sections which emit light are arranged. Because this edge does not face the tip of the sensing rod, on one side a direct noticing of an optical signal by the operator is made easier, on the other side an additional shielding of the light which is produced by an optical signal with respect to the information carrier which must be scanned is assured.

For the sections which emit light, carrier members of a different type may be provided. Thus, it is for example possible that an annular member which is partly arranged in the shaft and consists of transparent material forms a peripheral surface of the section which emits the light. Thus the annular member is arranged with its peripheral surface, which forms the section that emits light for example, on the external periphery of the shaft, with its remaining part inside the shaft. The annular construction is made possible by a guiding of light conducting elements also through this member, so that the construction of this zone of the sensing rod is not disrupted. According to a further development of the invention, the cross section of the annular member can form a torus which lies in a diameter plane, on which torus one or several light sources are arranged in the shaft, whereby then further tori of the member are arranged reflectingly in direction of the section which emits light. The cross section of the annular member can thereby be compared with the one of a multiple reflecting glass member which at an inlet surface receives the light from a light source and emits same again at an outlet surface. A different possibility of the construction of the annular member consists in providing on its part arranged in the shaft at least one recess for a light source. If the light source is then not arranged outside, but inside of the annular member, a light emission at the outlet surface occurs on one side by multiple reflections within the member, on the other side by direct light radiation, when the light source is suitably arranged within the member. The aforedescribed structural possibilities for the annular member include also the use of several light sources. For this, the recess can be constructed advantageously annularly and concentrically with respect to the annular member, so that in the thus created annular groove, the light sources can be provided in any desired arrangement or also the annular member can be inserted without any special alignment during assembly of the sensing rod.

In place of an annular member of transparent material, for example of glass or translucent plastic, it is, however, also possible to form several sections which emit light by the ends of the light conductors, the beginning ends of which are associated with one or several light sources. This structural principle leads then to a sensing rod which has on one part of its periphery several light fields, which can be distributed in a manner which has already been described on a peripheral line of the shaft. Because light conductors are provided, the arrangement of one single light source at any desired point within the sensing rod becomes possible, which point must not necessarily lie in the zone of the signalling, but can also be provided for example at the end of the sensing rod.

The light conductors are advantageously placed in an annular member which is partly arranged in the shaft, with the outer peripheral surface terminating flush with the surface of the annular member. Through this, it is possible to produce a closed element for the signalling operation, which during assembly of a sensing rod can easily be inserted into same. It is then only necessary to lead the ends of the light conductors to their respective light source or to conbine same in order to associate them with one single light source. For this purpose, the beginning ends of the light conductors can advantageously be combined by a coupling plate which must be arranged in front of a light source which is provided in the shaft. Also through this the assembly of a sensing rod is substantially simplified.

BRIEF DESCRIPTION OF THE DRAWING

Exemplary embodiments of a sensing rod which is constructed according to the invention will be described hereinafter in connection with the drawing, in which.

DETAILED DESCRIPTION

Figure 1:
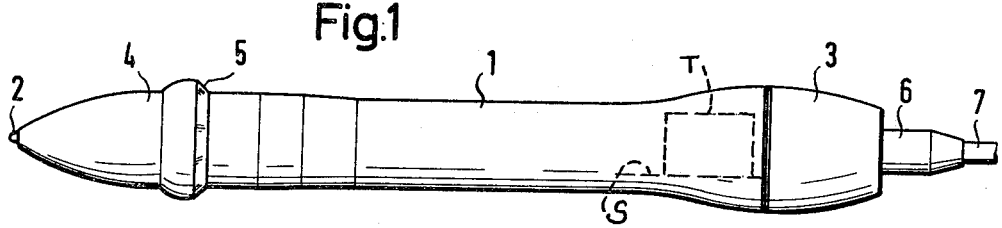
FIG. 1 is an outside view of a sensing rod according to the invention.

FIG. 1 illustrates a sensing rod adapted to scan graphic information. The sensing rod consists substantially of a hollow shaft 1, a sensing tip 2, a removable rear cap 3, a front part 4 having a signalling part 5 and a cable connection 6,7 which consists of a guide sleeve and a connecting cable 7 which is guided therein. One can see from FIG. 1 that the sensing rod is constructed so that its entirety is rotationally symmetrical and that the gripping zone in the central part of its length has a slightly smaller diameter than the front and rear parts in order to facilitate an easy handling thereof. The front part 4 of the sensing rod is constructed as a cap having internal threads thereon to hold the cap on the shaft 1. A removal of the cap 4 from the shaft 1 facilitates an easy exchange of light-conducting elements or of the elements which are provided for the optical signalling in the zone 5. By removing the rear cap 3, such as by unscrewing the threaded engagement with the shaft 1, the rear zone of the sensing rod becomes accessible so that, if necessary, the internally mounted opto-electronic transformer elements or circuit carriers T and support structure S therefor becomes accessible.

Figure 2:
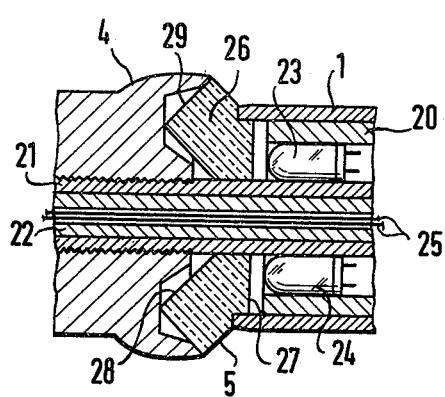
FIG. 2 is a cross section of a part of the sensing rod having an optical signalling device located therein.

FIG. 2 illustrates the cross section of a part of the front zone of the sensing rod illustrated in FIG. 1. This cross section shows the rear end of the front cap 4 and the area for a visual display of optical signalling. The cap 4 can, in the indicated manner, have, as stated above, an internal thread by which it can be screwed onto a corresponding external thread of a hollow inner sensing rod member 21. The cap 4 has a rearwardly enlarged diameter which on the outside permits the construction of a rounded-off enlargement of the cap. The cap 4 clamps between itself and the shaft 1 an annular member 26 of transparent material, for example of glass or translucent plastic material. The inner sensing rod member 21 is of a tubeshaped structure and functions to guide a further hollow member 22 having a central bore therethrough for guiding two light conducting fibers 25 therein. The light conducted through the light conducting fibers 25 serve to illuminate an information carrier or for receiving and transporting the light reflected on it.

Two sources of light 23 and 24 are associated with a torus 27 of the annular member 26, which light sources may be small miniature glow lamps. It is, however, also possible to use only one glow lamp since the annular member 26, due to its shape, permits multiple reflections. The light which is produced by one or several light sources 23 and 24 exits at the outer peripheral surface 5 so that same forms a light-emitting section. Further tori 28 and 29 of the annular member 26 are advantageously arranged at such angles to the torus 27 or to the outlet surface 5 that an optimum light emission at the outlet surface 5 is possible.

The miniature glow lamps 23 and 24 are arranged between the inner sensing rod member 21 and a tubeshaped support 20 which for example can be provided with bores for the glow lamps 23 and 24. The support 20 is inserted into the hollow sensing rod shaft 1 and can, if necessary, be removed from the shaft 1 with the glow lamps 23 and 24 therein, when the cap 4 has been unscrewed from the inner sensing rod member 21 and the annular member 26 has been removed.

Figure 3:
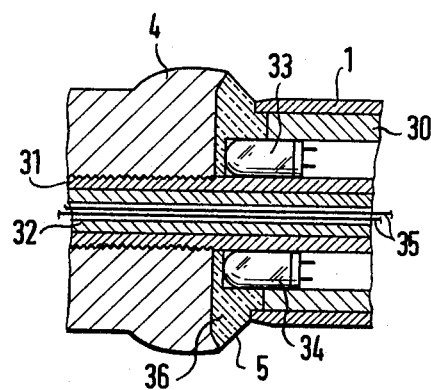
FIG. 3 is a cross section view, similar to FIG. 2, of a different embodiment of a sensing rod.

FIG. 3 illustrates a further exemplary embodiment for a part of a sensing rod of the type illustrated in FIG. 1, which part permits the aforesaid optical signalling. Here too an annular member 36 is provided, however, glow lamps 33 and 34 are not associated with same in such a manner that their light enters the annular member 36 through an inlet surface and is then concentrated by reflection onto the outlet surface 5. Instead, the annular member 36 has a rearwardly opening recess therein into which the glow lamps 33 and 34 are inserted. This recess is concentric with respect to the axis of the member 36, so that the member 36 does not need to be mounted in a special direction on the shaft 1, when the sensing rod is assembled. If, however, only one light source is provided, then it is possible to provide also only one recess in the form of one single bore in the annular member 36. The light emission occurs in this exemplary embodiment by a direct lighting of the outlet surface 5 by means of one of several glow lamps 33 and 34, because the glow lamps are inserted so far into the annular member 36, that a utilization of a multiple reflection structure within the member 36 is not absolutely necessary. Of course, the annular member 36 can also be constructed correspondingly to the already described member 26 so that aside from a direct light emission through the outlet surface 5, an additional reflection on annular outer surfaces is utilized.

Also in the embodiment illustrated in FIG. 3, the cap 4 functions to hold the annular member 36 on the shaft 1 of the sensing rod. The light sources 33 and 34 can be constructed as miniature glow lamps which are held between a pipe-shaped support 30 and a hollow inner sensing rod member 31. Also in the embodiment illustrated in FIG. 3, a guide 32 for the light conducting fibers 35 of the described type is provided, which guide 32 has a central bore therein.

Figure 4:
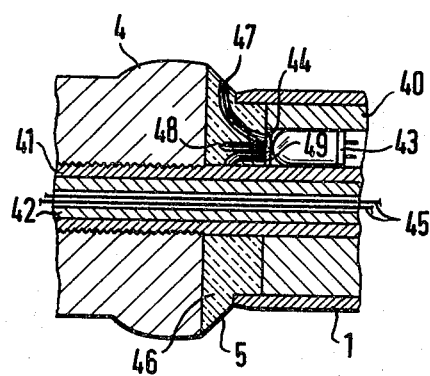
FIG. 4 is a cross section view, similar to FIG. 2, of a further embodiment of a sensing rod.

FIG. 4 illustrates an embodiment of a part of a sensing rod of the type shown in FIG. 1, which part facilitates an optical signalling, in which light conductors 47, 48 and 49 are associated with one single light source 43 in the form of a miniature glow lamp. The light conductors 47, 48 and 49 are combined at their starting ends on a coupling plate 44 which is arranged on the front side of the glow lamp 43. The ends of the light conductors form the sections 5 which emit light and which can be evenly distributed along a peripheral line on the sensing rod. Such a section 5 which emits light is illustrated in FIG. 4 only for the light conductor 47, since the ends of the remaining light conductors 48 and 49, due to the cross-sectional illustration are not visible.

The light conductors 47, 48 and 49, the number of which is not to be limited to three, can advantageously be placed in an annular member 46, which may, for example, consist of a plastic material. The light conductors 47, 48 and 49 may be cast into said annular member 46 so that they are positioned nonmovably and can be mounted with said member 46 as a unit during assembly of the sensing rod. The annular member 46 is clamped between the cap 4 which can be screwed onto the threaded inner sensing rod member 41 and the shaft 1 of the sensing rod. The glow lamp 43 is held between the inner sensing rod member 41 and a pipe-shaped support 40 which is provided with a bore for receiving the glow lamp 43. Also in the embodiment illustrated in FIG. 4, a guide 42 having a central bore adapted to receive light conducting fibers 45 is provided and is mounted internally of the sensing rod member 41.

Figure 5:
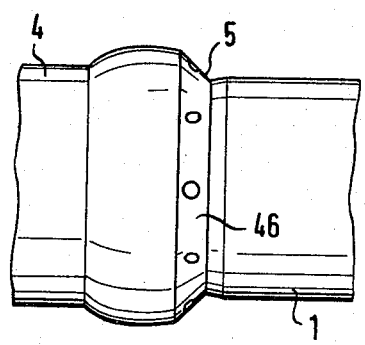
FIG. 5 is an outside view of a part of the sensing rod illustrated in FIG. 4.

FIG. 5 illustrates an arrangement of the type illustrated in FIG. 4 as viewed from the outside view. The cap 4 has at its rear end an enlarged diameter. The light-emitting section 5 is arranged adjacent and to the rear of the cap 4 and the ends of the light conductors 47, 48, 49 etc. terminate flush with the exterior surface of the light-emitting section. The annular member 46 is clamped between the cap 4 and the shaft 1 of the sensing rod. Its exterior surface of the annular member 46 does not face the tip of the sensing rod since the diameter of the enlarged portion of the cap is greater than the diameter of the shaft 1 and since the exterior surface of the annular member 46 is bevelled, the bevelled surfaces face rearwardly toward the eye of the operator so that a direct visual inspection of the signalling is assured. This is also true for the aforedescribed exemplary embodiments illustrated in FIGS. 2, 3 and 4, because the respective exterior surface 5 or the section which emits the light also does not face the tip of the sensing rod primarily due to the differences in diameter between the rear end of the cap 4 and the shaft 1 of the sensing rod but, instead, faces the operator.

A particular advantage of the embodiment illustrated in FIGS. 4 and 5 is that the light source for lighting the sections 5 which emit light do not need to be arranged directly on the annular member 46, as this is illustrated in FIG. 4. It is, contrary to this illustration, also possible to extend the light conductors 47, 48, 49 etc. for example to the rear end of the sensing rod, if the space for an additional glow lamp is only present somewhere else. In this case, an annular member 46 of a suitably changed form must be used, which for example does not combine the light conductors 47, 48, 49, etc. directly, but fixes only their orientation on the outer peripheral surface.

The individual structural parts of the sensing rod according to the invention can be manufactured of light plastic or also of aluminum. The shaft 1 of the sensing rod consists advantageously of a metal because it is constructed as a relatively thin-walled pipe and has available on the inside thereof sufficient space for spare parts which are here not described.

The pipe-shaped support 20 and the sensing rod member 21 are connected at not illustrated points within the sensing rod. (See attorney's reference, Schaumburg Case 5.) Of course, it is also possible to construct both parts 20 and 21 in one piece and to insert the respective glow lamps into corresponding recesses of the thus formed uniform element.

The embodiments of the invention in which an exclusive property or privilege is claimed are defined as follows:

1. A sensing rod for the manual scanning of graphic information having a tip which is adapted to emit light and to receive light which is reflected from an information carrier and a light conducting element, comprising the improvement wherein a hollow shaft has, on the peripheral surface thereof a gripping zone and at least one light-emitting section between said gripping zone and said tip which is optically coupled with at least one light source arranged in said shaft.

2. A sensing rod according to claim 1, wherein said light-emitting section is constructed as a ring which extends around said shaft.

3. A sensing rod according to claim 2, wherein said shaft has an annular part of enlarged diameter and houses said light-emitting section therein.

4. A sensing rod according to claim 3, wherein said annular part of enlarged diameter forms an annular edge not facing said tip of said sensing rod, on which edge said light-emitting section is arranged.

5. A sensing rod according to claim 1, wherein a plurality of light-emitting sections are circumferentially spaced along a theoretical circumferential line on said shaft.

6. A sensing rod according to claim 5, wherein said shaft has an annular part of enlarged diameter and houses said plurality of light-emitting sections therein.

7. A sensing rod according to claim 6, wherein said annular part of enlarged diameter forms an annular edge not facing said tip of said sensing rod, on which edge said light-emitting sections are arranged.

8. A sensing rod according to claim 5, wherein said light-emitting sections are formed by the ends of light conductors, the beginning ends of which are associated with at least one light source.

9. A sensing rod according to claim 8, wherein said light conductors are embedded in an annular member which is partly arranged in said shaft, the ends of said light conductors terminating flush with the outer peripheral surface of said annular member.

10. A sensing rod according to claim 8, wherein the beginning ends of the light conductors are combined by a coupling plate which is arranged in front of a light source provided in said shaft.

11. A sensing rod according to claim 1, wherein said light-emitting section includes an annular member of transparent material partly arranged in said shaft and forming a peripheral surface on said shaft.

12. A sensing rod according to claim 11, wherein the cross section of said annular member forms a torus which lies in a diametral plane and having at least one light source arranged therein and wherein further tori of said annular member are arranged reflectingly in said light-emitting section.

13. A sensing rod according to claim 11, wherein said annular member has on its part which is arranged in said shaft at least one recess for receiving a light source therein.

14. A sensing rod according to claim 13, wherein said recess is constructed annularly and concentrically with respect to said annular member.

15. A sensing rod according to claim 1, wherein said shaft has an opto-electronic transformer device mounted therein.

\* \* \* \* \*